Dec. 10, 1935.  M. MUSGRAVE  2,023,643
BRAKE TESTER
Filed Dec. 22, 1928  3 Sheets-Sheet 1
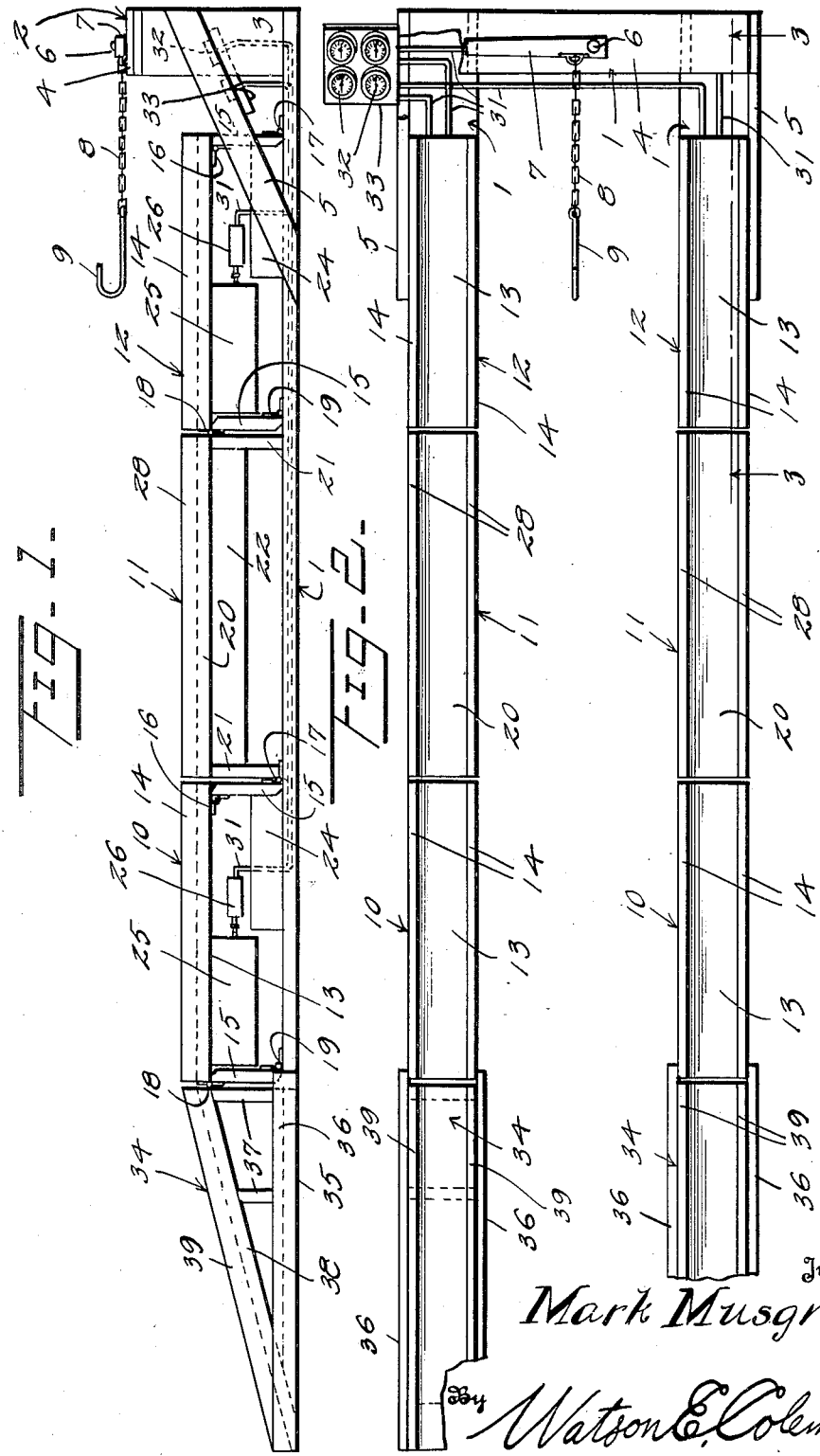
Inventor
Mark Musgrave
By Watson E. Coleman
Attorney

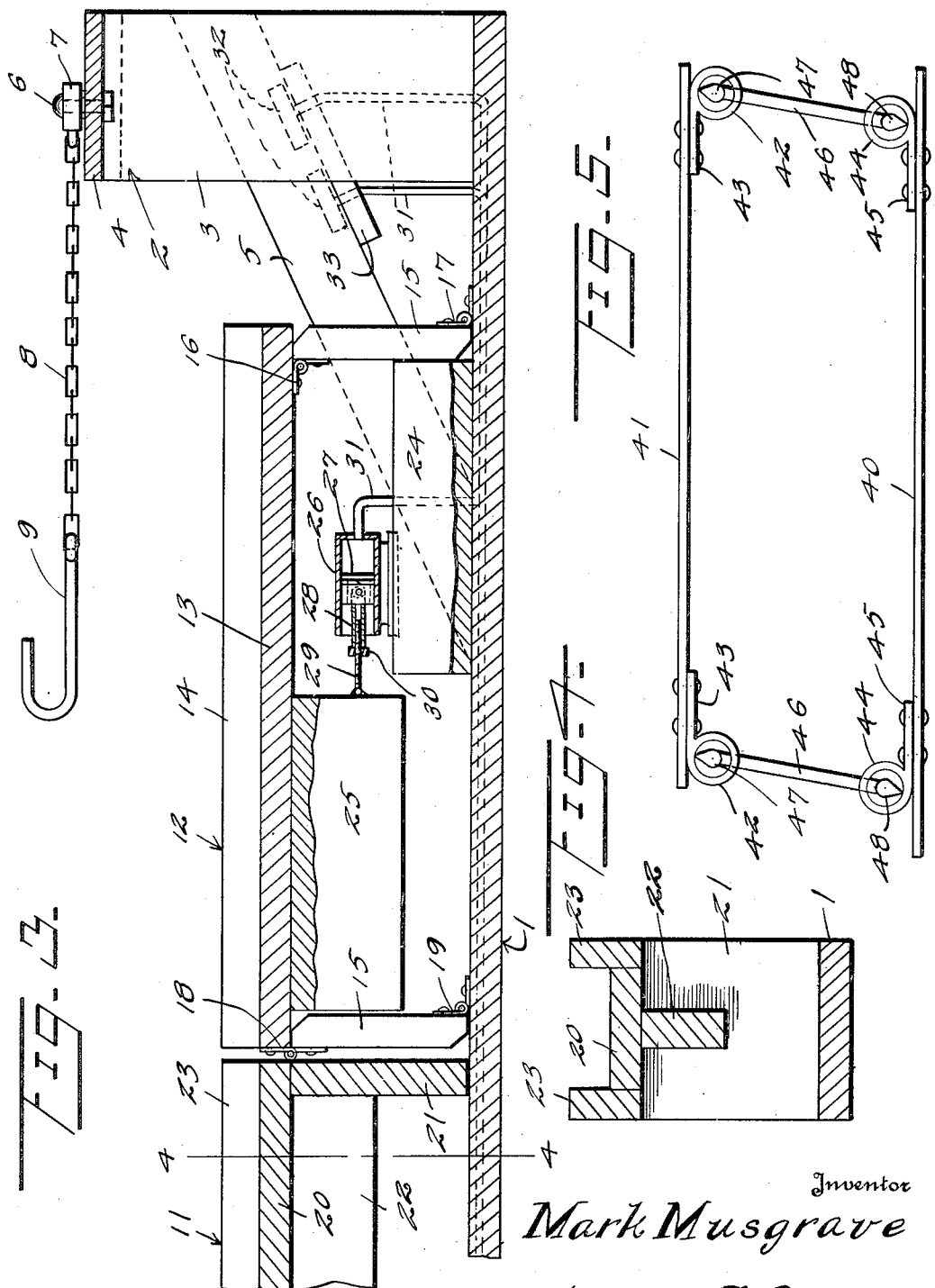

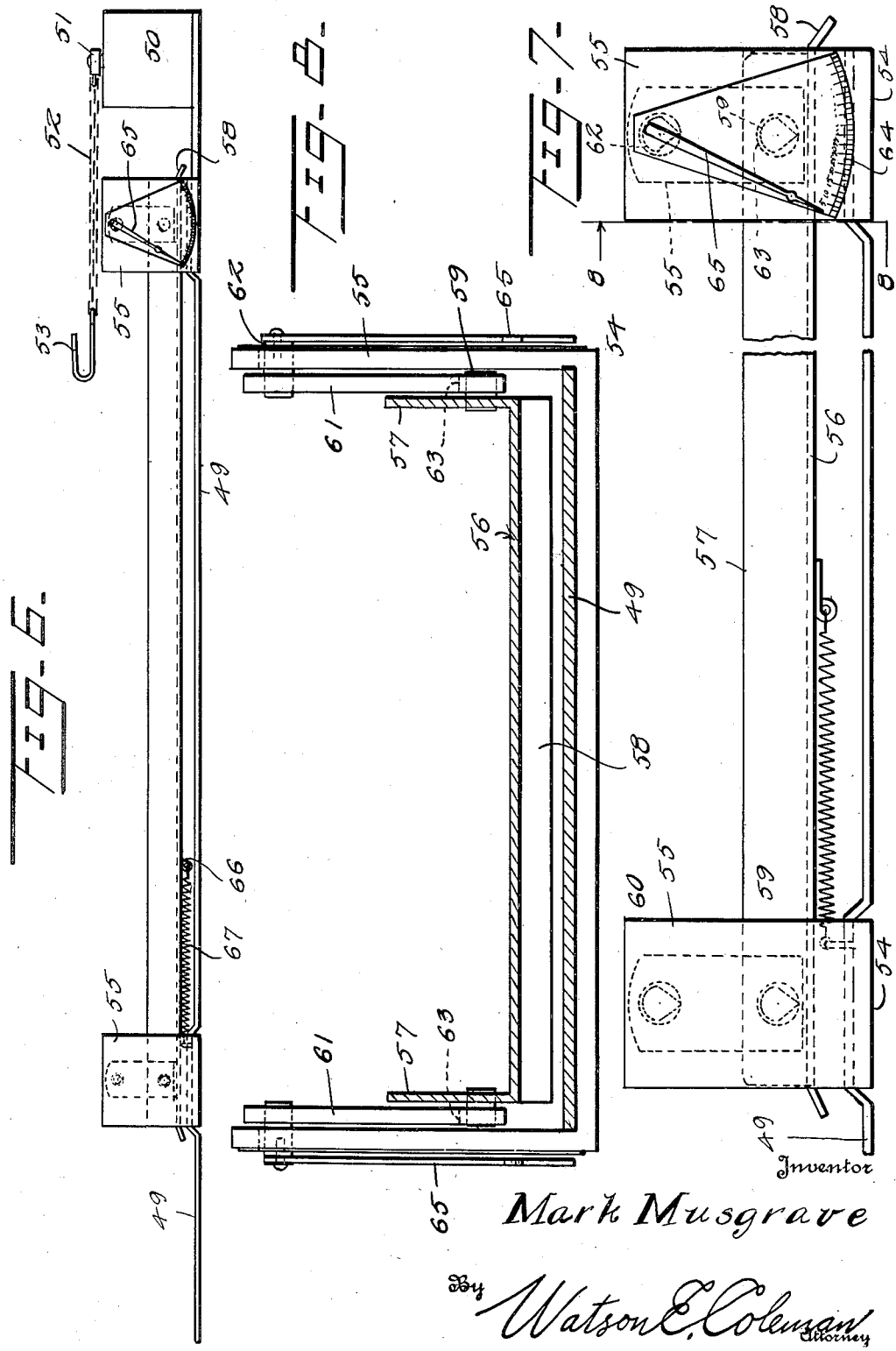

Patented Dec. 10, 1935

2,023,643

UNITED STATES PATENT OFFICE 2,023,643

BRAKE TESTER

Mark Musgrave, Pittsburg, Kans., assignor to Vanita H. Musgrave, Springfield, Ohio Application December 22, 1928, Serial No. 327,897

19 Claims. (Cl. 265—47)

This invention relates to testing machines and pertains particularly to a machine for testing automobile brakes.

The primary object of the present invention is to provide an efficient, accurate machine of simple construction whereby the efficiency of motor vehicle brakes may be easily and quickly determined.

Another object of the invention is to provide a brake testing device of such a character that a motor vehicle placed thereon will be held in a manner to facilitate the performance of other operations upon the vehicle.

A still further object of the invention is to provide a testing machine of the character above described which may be easily, quickly and economically constructed.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention, as expressed in the appended claims.

In the drawings:—

Figure 1 is a view in side elevation of the brake testing machine embodying the present invention;

Figure 2 is a top plan view of the machine, parts thereof being broken away;

Figure 3 is a longitudinal sectional view taken upon the line 3—3 of Figure 2;

Figure 4 is a transverse sectional view taken upon the line 4—4 of Figure 3;

Figure 5 is a view in side elevation of a modified form of the tiltable platform structure, the same being shown free of the movement limiting blocks and cylinder mounted therewith in practice;

Figure 6 is a side elevational view of one end of a further modified form of the present invention;

Figure 7 is an enlarged view in side elevation of a platform and supporting structure therefor;

Figure 8 is a sectional view taken upon the line 8—8 of Figure 7.

Referring to the drawings in detail wherein like numerals of reference indicate corresponding parts throughout the several views, the testing machine embodying this invention is preferably provided with a base structure comprising a pair of longitudinally extending base planks 1 arranged in spaced parallel relation in the manner shown.

These base planks at the forward ends thereof are connected by a relatively high platform 2 which is made up of a pair of spaced upright structures 3 each supported upon one of the base planks and a transverse connecting plank 4 between the tops of the structures. Suitable bracing bars 5 are extended from the upper portions of the upright structures 3 rearwardly and downwardly for connection with the outer side of the adjacent base plank.

The top of the transverse platform 2 carries at the central portion thereof a pivot pin 6 to which is attached a lever 7. This lever has secured thereto one end of a chain 8 which carries at its other end a hook 9 designed for engagement with the front axel of a vehicle placed upon the testing machine as will be hereinafter more fully described. The end of the chain 8 which connects to the lever 7 engages the lever inwardly of the pivot 6, as shown.

Each of the base planks 1 supports three alined platforms 10, 11 and 12. The rearward and forward platforms 10 and 12 respectively upon each base plank comprise elongated top portions or planks 13 bordered along each longitudinal edge by the upstanding flanges 14 and supported at each end by the upstanding supports 15.

As shown, the forward support 15 of each of the platforms 10 and 12 has hinged connection as at 16 between its inner face at the top and the under side of the adjacent top member 13 while at its lower side or bottom it has hinged connection as at 17 between the forward or outer face and the base plank 1. The rear supporting member 15 of each of the platforms 10 and 12 has a hinge connection 18 between the outer face at the top and the adjacent end of the member 13 while the bottom edge has hinged connection as at 19 between the inner face and the supporting base plank 1. From this it will be readily understood that the hinged connections between the platforms 10 and 12 and their supporting base planks is such that these platforms may be swung or tilted forwardly on their supporting bases, rising up during this tilting movement upon the corners of the supporting members 15.

Interposed between the members 10 and 12 of each base plank, is the intermediate removable platform 11 which, like the other platforms consists of a top plank 20 supported at each end by an upright 21. The uprights 21 of these intermediate platforms however, are rigid at their upper ends with the plank which they support and a central reinforcing strut 22 is positioned against the under face of the top 20 abutting thereagainst and further abutting and connecting the supports as shown. These intermediate platforms also have at each side a longitudinally extending guard 23 which, like the guards 14 of the tiltable platforms assists in guiding the wheels of a vehicle run onto the machine.

Adjacent the forward end and beneath each of the tiltable platforms 10 and 12, and supported upon the underlying base plank, is a movement limiting block 24 and secured to the under side of the body 13 of each of the tiltable members 10 and 12, at the rear of the same, is an associate movement limiting block 25. These blocks 24 and 25 as shown have their adjacent ends in spaced relation when the tiltable platforms are in their normally upright position, but, are designed to come together, under certain conditions hereinafter described, to prevent the tiltable platforms from tilting beyond a predetermined degree.

Mounted upon each of the base plank supporting blocks 24 is a piston cylinder 26 housing a piston 27 which carries a tubular piston rod 28, which extends rearwardly from the cylinder in the direction of the adjacent block 25. Each of the piston rods 28 has threaded thereinto the extension rod 29 which carries a lock nut 30 designed to jam against the end of the piston rod, the rear end of the extension rod being secured to the face of the adjacent block 25 in the manner shown. This connection of the extension rod 29 with the connecting rod 28 permits of adjustments to the piston to compensate for any leakage of fluid therefrom. It is, of course, understood that the connection between the rod 29 and the adjacent block 25 or between the piston rod 28 and its associate piston must be such as to permit the rod to swing during the movement of the overlying platform so that the piston can move properly within its cylinder without jamming.

Connected with the forward end of each of the cylinders 24 is an oil line 31 of any character, the oil line of each cylinder running to a suitable pressure gauge 32 mounted preferably at the forward end of the machine on one side thereof, as for example, upon the platform 33.

Removably positioned against the rear end of each base plank 1 and in longitudinal alinement therewith, is an approach run indicated generally by the numeral 34. Each approach comprises a base portion 35 having the longitudinally extending side members secured thereto and extending at their forward ends slightly beyond the forward end of the base to receive the rear end of the base plank against which the run is positioned.

Held in position by suitable uprights 37 on the base of each approach, is an inclined plank 38 bordered along each longitudinal edge by a guard 39. The rear end of each approach plank 38 rests directly upon the underlying base while the forward end thereof is of substantially the same height as the rear shiftable platform 10 against which it positions.

In the operation of this machine a motor vehicle is run onto the tiltable platforms 10 and 12 over the approaches 34 and the removable intermediate platforms 11. The hook 9 which is connected with the lever 7 mounted upon the forward transverse platform 2 is then attached to the front axle of the vehicle and the vehicle brakes are set.

The lever 7 is then swung in the proper direction to exert a pull upon the vehicle and if all of the brakes of the vehicle hold this pull will cause the supporting tiltable platforms 10 and 12 to swing or tilt forwardly. When this tilting of the platforms occurs the piston 27 of each cylinder 24 will be forced forwardly in the cylinder and will compress oil in the line 31 attached thereto, this compression of the oil causing the gauge to which the oil line runs to be actuated. It is, of course, apparent that if three of the brakes hold and one slips, the tilting platform 10 carrying that wheel controlled by the slipping brake will not be swung forwardly to the same extent as the other platforms, the wheel turning instead of remaining stationary and moving the supporting platform. In this case the gauge connected with the platform which is not moving the same as the other platforms will fail to register the same as the other gauges.

In the event that the oil line leading to any one of the cylinders should burst, the particular platform controlled thereby will be prevented from swinging forward to a dangerous angle or collapsing by the engagement of the block 25 with the underlying block 24 carried by this platform.

While the present description has been confined to the showing of supporting base planks and upright members for the tilting platforms having hinged connections at their top and bottom edges it is of course, apparent that modification of this structure may be made without departing from the spirit of the invention and as an example Figure 5 is a modified structure of the invention.

In the modified form shown in Figure 5, which showing is confined to one tiltable platform exclusive of the movement limiting blocks and the piston and cylinder structure associated therewith, the numeral 40 indicates a portion of the base structure which may be of steel or other suitable material while the numeral 41 indicates the top of the platform. The under face of the platform at each end and adjacent each side carries a depending bearing eye 42 which has formed integral therewith a tongue 43 designed to facilitate its application to the body in the manner shown. The bearing eyes at each end of the platform body 41 are alined transversely of the body as shown and positioned upon the base 40 directly beneath each of the eyes 42 of the platform is a similar bearing eye 44 having its attaching tongue 45 secured to the base.

Supporting the forward and rear ends of this platform are upright frames 46 from the sides of which at the top and the bottom extend the knife bearings 47 and 48 respectively.

The knife bearings 47 at the top of the frame work in the bearing eyes 42 while the knife bearings 48 at the bottom of the frame work in the bearing eyes 44 of the base. This method of mounting the tiltable platforms permits of their being more easily actuated than when they are mounted as described in connection with the structure shown in Figures 1 to 4.

In Figures 6 to 8 a still further modified form of the brake tester embodying this invention is shown, in which form the approaches are dispensed with and the oscillatable platforms are in closer proximity to the ground.

In this modified form of my brake tester there is employed a pair of base runs 49 arranged in spaced parallel relation and these runs, which may be constructed of relatively broad strips of cast-iron, are connected at one end by a platform 50 which extends transversely in the manner shown, to the top central portion of which is pivotally attached a pull lever 51 carrying the chain 52 terminating in a hook 53 designed to engage the front axle of a vehicle as described in connection with the foregoing figures.

Each of the runs 49 has secured transversely thereof adjacent each end a pair of spaced brackets 54 each of which terminates in an upstanding portion 55 which projects upwardly from one side of the run in the manner shown.

Overlying each end of each run 49 is an elongated channeled platform 56, the side flanges 57 thereof extending upwardly as shown, and the ends of the platform are each disposed between a pair of upstanding members 55 of a bracket. Each end of each platform 56 is turned downwardly as indicated at 58.

Each of the flanges of each platform has each end provided with a laterally projecting knife bearing 59 and each upstanding portion 55 of each bracket 54 has a bearing opening 60 adjacent the upper end thereof as shown Each end of each of the platforms 56 is supported at each end a slight distance above its run 49 by a hanger member 61 which has projecting laterally from the upper end a knife bearing 62 which engages in the bearing opening 60 of the adjacent upstanding bracket member 55 and at its lower end has a bearing opening 63 which receives the adjacent knife bearing 59 of the platform.

The outer face of one of the four upstanding members 55 associated with each platform has an arcuate scale 64 and the bearing 62 associated with this upright carries at its outer end the indicating finger or pointer 65 which extends downwardly over the face of the scale in the manner shown.

At its rear or approach end, each of the platforms 56 has connected to the under face thereof as at 66 one end of a spring 67, the other end thereof being attached to the base or run 49.

This spring gives the necessary resistance to the movement of the platform to exert a strain upon the applied brake of the vehicle wheel mounted thereon, when a pull is exerted upon the vehicle by actuation of the lever 51 in the manner described in connection with the structure first described.

From the foregoing description it will be readily understood that the action of the form just described is substantially the same as in the preferred form, except that the bearing connections between the platforms and the supporting brackets therefor are such that the entire device may be operated easier and in this form the machine whose brakes are to be tested may be run directly onto the testing machine without the necessity of using approach members.

It will be seen that when an automobile is in position upon the tester, the brakes of the automobile applied and a pull exerted thereon by the elements 51, 52 and 53 each of the indicators 65 will be swung across its scale showing the degree of resistance offered to the turning of the wheels by the brakes and also showing whether or not all of the brakes are adjusted to the same holding power.

It is, of course, to be understood also that while the present showing and description has been confined to a manually operated means for pulling upon the vehicle supported on the tiltable platforms, any other suitable means for performing this operation may be employed if desired.

Having thus described my invention, what I claim is:—

1. A brake tester comprising a pair of structures each including three elongated alined platforms, supporting structures forming a part of the end ones of each group of three platforms having hinged connection therewith for permitting longitudinal oscillatory movement thereof, means for limiting the movement of each oscillatory platform, a pressure gauge for each oscillatory platform, a compressor cylinder mounted adjacent each oscillatory platform and having a fluid line connection with a gauge, connecting means between each compressor and the adjacent oscillatory platform, and means for exerting a pull upon a vehicle supported upon the oscillatory platforms.

2. A brake testing machine of the character described, comprising a pair of base members arranged in spaced parallel relation, a transverse platform across and connecting said members at one end, a trio of elongated platforms arranged in alinement upon each of said bases and each comprising a top structure and upright supporting members at each end of the top structure, hinged members connecting the suporting members of the end ones of each trio of platforms at the tops and bottoms thereof with the platform top and base respectively to permit said end ones of the platforms to oscillate longitudinally, a pressure indicator for each platform, means connected with and operated by each of said oscillatory platforms upon movement thereof for actuating said pressure indicators, and means carried by the transverse platform for exerting a pull upon a vehicle carried by the oscillatory platforms.

3. A brake testing machine of the character described, comprising a pair of base members arranged in spaced parallel relation, a transverse platform across and connecting said members at one end, a trio of elongated platforms arranged in alinement upon each of said bases and each comprising a top structure and upright supporting members at each end of the top structure, hinged members connecting the supporting members of the end ones of each trio of platforms at the tops and bottoms thereof with the platform top and base respectively to permit said end ones of the platforms to oscillate longitudinally, a pressure indicator for each platform, means connected with and operated by each of said oscillatory platforms upon movement thereof for actuating said pressure indicators, means carried by the transverse platform for exerting a pull upon a vehicle carried by the oscillatory platform, and means for limiting the movement of the oscillatory platforms.

4. A vehicle brake tester comprising a pair of spaced parallel structures each consisting of a pair of wheel supporting platforms, a pair of normally vertically arranged members associated with each platform, one adjacent each end thereof, means for supporting said members, bearings connecting said members with the supporting means and with the platforms whereby the inclination of the members from normal vertical position is permitted to move the platforms in parallel paths, a pressure indicator for each platform, and a compressor element connected with each indicator and operated by and upon the inclination of said members to show the degree of movement thereof upon the application of a pull to a vehicle mounted on the platforms and having its brakes applied.

5. A brake tester comprising a pair of vehicle wheel supporting platforms arranged in spaced parallel relation, uprights at each end and upon each side of each platform, each of said uprights having an aperture therein in a plane above the platforms, said platforms having an upstanding portion adjacent each of said uprights, a hanger member adjacent the inner face of each upright, a knife bearing element carried by each hanger and positioning in the aperture in the adjacent upright, each of said hangers having an aperture in its lower end, a knife bearing element carried by each upstanding portion of each platform and engaging in the aperture of the adjacent hanger, a scale carried by one of said uprights, the knife bearing adjacent said scale extending through the upright, a pointer carried by the knife bearing extending through the upright for coaction with the scale, and resilient means for maintaining the platforms in a predetermined position.

6. In a vehicle brake tester, an oscillatable support for each wheel having associated therewith a pressure indicator and means yieldably resisting movement of the supports and actuated thereby for operating said indicator, comprising a platform, a base portion, a pair of upright supporting frames arranged in spaced relation beneath said platform upon said base and disposed transversely thereof, each of said frames having a pair of outwardly projecting knife bearings at each side edge, one adjacent the top thereof and the other adjacent the bottom, a pair of bearing eyes carried by the platform upon its under face adjacent each of said supporting frames and each receiving a knife bearing at the top of the adjacent frame, and a pair of bearing eyes carried by the base adjacent each of said frames and each having one of said knife bearings at the bottom of the adjacent frame mounted therein, said platform being oscillatable in an arcuate path upon the knife bearings of said frames.

7. A brake tester, comprising a platform designed to receive a wheel on a vehicle, normally upright supports for said platform, a bearing coupling each support at one end with the platform, a bearing between the other end of each support and a carrying structure, an indicator for the platform, and means yieldably resisting movement of the platform connecting the indicator with the platform, whereby, upon the tilting of the supports of the platform when a pull is exerted upon the vehicle while the brake is on the supported wheel, the amount of swing of the platform will be indicated.

8. A vehicle brake tester, comprising a plurality of platforms each designed to carry a vehicle wheel, normally upright elements carrying each platform, supporting means for the elements, pivotal connections between the elements and the platforms, pivotal connections between the elements and the supporting means therefor, the said pivotal connections permitting the oscillation of the platforms in an arcuate path about a horizontal axis, means to resist said oscillations and means for indicating the extent of movement of each platform when a pull is exerted upon a brake applied vehicle having a wheel thereon.

9. A device for testing a motor vehicle wheel brake, comprising a body designed to receive a wheel on a vehicle, means supporting the body for oscillation in an arcuate path about a horizontal axis while the vehicle wheel is thereon, the said body normally lying at the low point of the said path and rising therefrom against gravity and the weight of the vehicle whose wheel is thereon, means for pulling the vehicle while the brake of the said wheel is applied, and an indicator actuated by and indicating the degree of movement of the body.

10. A device for testing a motor vehicle wheel brake, comprising a body designed to receive a wheel on a vehicle, means supporting the body for oscillation in an arcuate path about a horizontal axis while the vehicle wheel is thereon, the said body normally lying at the low point of the said path and rising therefrom against gravity and the weight of the vehicle whose wheel is thereon, means for pulling the vehicle while the brake of the said wheel is applied, an indicator actuated by and indicating the degree of movement of the body, and means normally resiliently holding said body in its normal position at the low point of its arcuate path.

11. A device for testing a motor vehicle wheel brake, comprising a body designed to receive a wheel on a vehicle, means for suspending said body for oscillation in an arcuate path about a horizontal axis, means for exerting a pull upon a vehicle having its wheel upon the body with its brake applied, and means connected with the body for indicating the degree of oscillation thereof.

12. In a device for testing a motor vehicle wheel brake, a body designed to receive a wheel on a motor vehicle, means for exerting a pull on the vehicle, means for supporting said body whereby it may shift in a vertical arcuate path against the action of gravity and the weight of the vehicle when the vehicle is pulled with the brakes applied, and means for indicating the degree of oscillation of the body.

13. A motor vehicle brake tester, comprising a carrier for a wheel of the vehicle, means for effecting the movement of the vehicle while the brake of the wheel on the carrier is applied, means for swingingly supporting the carrier, means tending to resist said movement and an indicator connected with and actuated by the carrier for showing the extent of swing thereof.

14. A vehicle brake tester, comprising a carrier for a wheel of the vehicle, means operative to move the vehicle to rotate the wheel while the brake of the wheel on the carrier is applied, means permitting movement of the carrier vertically upon operation of said first means whereby the pressure of the brake is counteracted by the weight of the vehicle, and means for indicating the movement of the carrier.

15. A vehicle brake tester, comprising a carrier for a wheel of the vehicle, means adapted to move the vehicle to rotate the wheel while the brake of the wheel on the carrier is applied, means permitting movement of the carrier vertically upon operation of said first means whereby the pressure of the brake is counteracted by the weight of the vehicle, and means operated by the movement of the carrier for indicating the degree of such movement.

16. A vehicle brake tester, comprising a plurality of platforms each designed to carry a vehicle wheel, hingedly mounted elements supporting said platforms for oscillating movement in an arcuate path, a pressure indicator for each platform, a compression device connected with each indicator and operated upon by the adjacent platform, when the same is oscillated, to actuate the indicator, and means for exerting a pull upon the vehicle supported by the platforms.

17. A motor vehicle brake tester, comprising a pair of structures each including three aligned platforms, elements supporting the end platforms of each of said structures and hingedly mounted to permit longitudinal oscillatory movement of said platforms in an arcuate path, a compressor including a cylinder and a piston and having the piston connected with each oscillatory platform and actuated thereby, and a pressure gauge for and connected with each compressor.

18. In a brake testing machine, a support for a vehicle wheel, and means supporting said wheel support for movement in an arcuate path from a normal position where the weight of the supported wheel has least leverage in opposing resistance to an applied brake, the said leverage gradually increasing as the support moves from said normal position.

19. In a vehicle brake tester, a plurality of supporting bodies arranged for each to support a wheel of a vehicle, means pivotally coupled with each body supporting the same for movement in an arcuate path from a normal position, and an indicator for and actuated by the movement of each body, the said normal position being that in which the weight of a vehicle on the bodies has least leverage in opposing resistance of the wheels brakes and the said leverage gradually increases with movement of the bodies from said position along said path.

MARK MUSGRAVE.